United States Patent [19]
Dietrich

[11] 3,921,773
[45] Nov. 25, 1975

[54] CLUTCH WITH SLACK TAKE UP AND RELEASE MOTORS

[76] Inventor: Howard H. Dietrich, 87 Commandor Parkway, Rochester, N.Y. 14625

[22] Filed: June 10, 1974

[21] Appl. No.: 477,594

Related U.S. Application Data
[62] Division of Ser. No. 262,236, June 13, 1972, Pat. No. 3,815,713.

[52] U.S. Cl. .......... 192/83; 192/111 A; 192/109 D; 91/413; 92/143
[51] Int. Cl.² ......................................... F16D 25/08
[58] Field of Search ............ 192/111 A, 91 R, 91 A, 192/109 D, 83

[56] References Cited
UNITED STATES PATENTS

| | | | |
|---|---|---|---|
| 2,104,731 | 1/1938 | Bragg | 192/91 R X |
| 2,111,281 | 3/1938 | Dodge | 192/91 R X |
| 3,292,751 | 12/1966 | McRay et al. | 192/3.57 |
| 3,430,744 | 3/1969 | Oguri | 192/111 A |
| 3,478,853 | 11/1969 | Kraeplin | 192/111 A |
| 3,489,257 | 1/1970 | Nakano | 192/111 A |
| 3,812,942 | 5/1974 | Espenschied | 192/91 R |

FOREIGN PATENTS OR APPLICATIONS
| | | | |
|---|---|---|---|
| 877,590 | 9/1961 | United Kingdom | 192/91 R |

Primary Examiner—Benjamin W. Wyche
Attorney, Agent, or Firm—Shlesinger, Fitzsimmons & Shlesinger

[57] ABSTRACT

An automobile clutch, or the like, is adapted to be disengaged by operating either a combination clutch override and brake pedal, or a powered clutch pedal. If an electric pushbutton switch is operated before the override pedal is operated, the pedal will actuate the parking brake. If this switch is not pushed, operation of the override pedal will disengage the clutch, and will automatically release the parking brake if the latter was previously applied. The powered clutch pedal can be used only when the engine is operating. It controls a valve actuator, which selectively connects a power unit to the vacuum side of the engine manifold. When the pedal is depressed during engine operation, the manifold vacuum first takes up any slack developed in the clutch actuating mechanism and then disengages the clutch until the pedal is released. A dashpot device controls the reengagement of the clutch faces.

5 Claims, 5 Drawing Figures

FIG. 1

CLUTCH WITH SLACK TAKE UP AND RELEASE MOTORS

This is a division of application Ser. no. 262,236, filed June 13, 1972, now U.S. Pat. No. 3,815,713.

This invention relates to automotive vehicles, and more particularly to a combination clutch-parking brake actuator for vehicles of the type having a standard "stick-shift" type transmission.

Automotive vehicles of the type having a standard or so-called stick-shift automotive transmission, as distinguished from an automatic transmission, include the usual clutch mechanism that must be operated whenever the transmission is to be shifted from one gear to another. Although it is usually cheaper to manufacture and install than the automatic transmission, the standard transmission does have the disadvantage that its associated clutch mechanism must be operated, usually through manipulation of a standard clutch pedal, each time the operator wishes to shift the transmission. Since the standard clutch pedal is generally operated against the resistance of a relatively heavy spring load, the necessity of repeatedly operating the clutch pedal can become very tiresome; and for this reason the automatic transmission, which eliminates this manual shifting operation, has become very popular in recent years. A further disadvantage of the conventional, standard transmission is that any wear that develops in its clutch system will be reflected in the degree that the clutch pedal must be manipulated to enable the transmission to be shifted.

It is an object of this invention, therefore, to eliminate much of the manual effort heretofore required to operate the clutch systems of conventional transmissions of the type described. To this end, therefore, it is an object also of this invention to develop an improved clutch actuator for a standard automotive transmission system.

Another object of this invention is to provide for a standard automotive transmission an improved clutch actuating mechanism that is substantially easier to operate than prior such mechanisms.

Still another object of this invention is to provide an improved clutch actuating mechanism which will reduce the wear upon, and hence prolong the life of, the associated clutch faces.

A further object of this invention is to provide a novel clutch actuator which is operable also to control a vehicle's parking brake.

A more specific object of this invention is to provide a novel fluid pressure operated mechanism for manipulating the clutch of a standard automotive transmission.

Other objects of the invention will be apparent hereinafter from the specification and from the recital of the appended claims, particularly when read in conjunction with the accompanying drawings.

Figure 1:
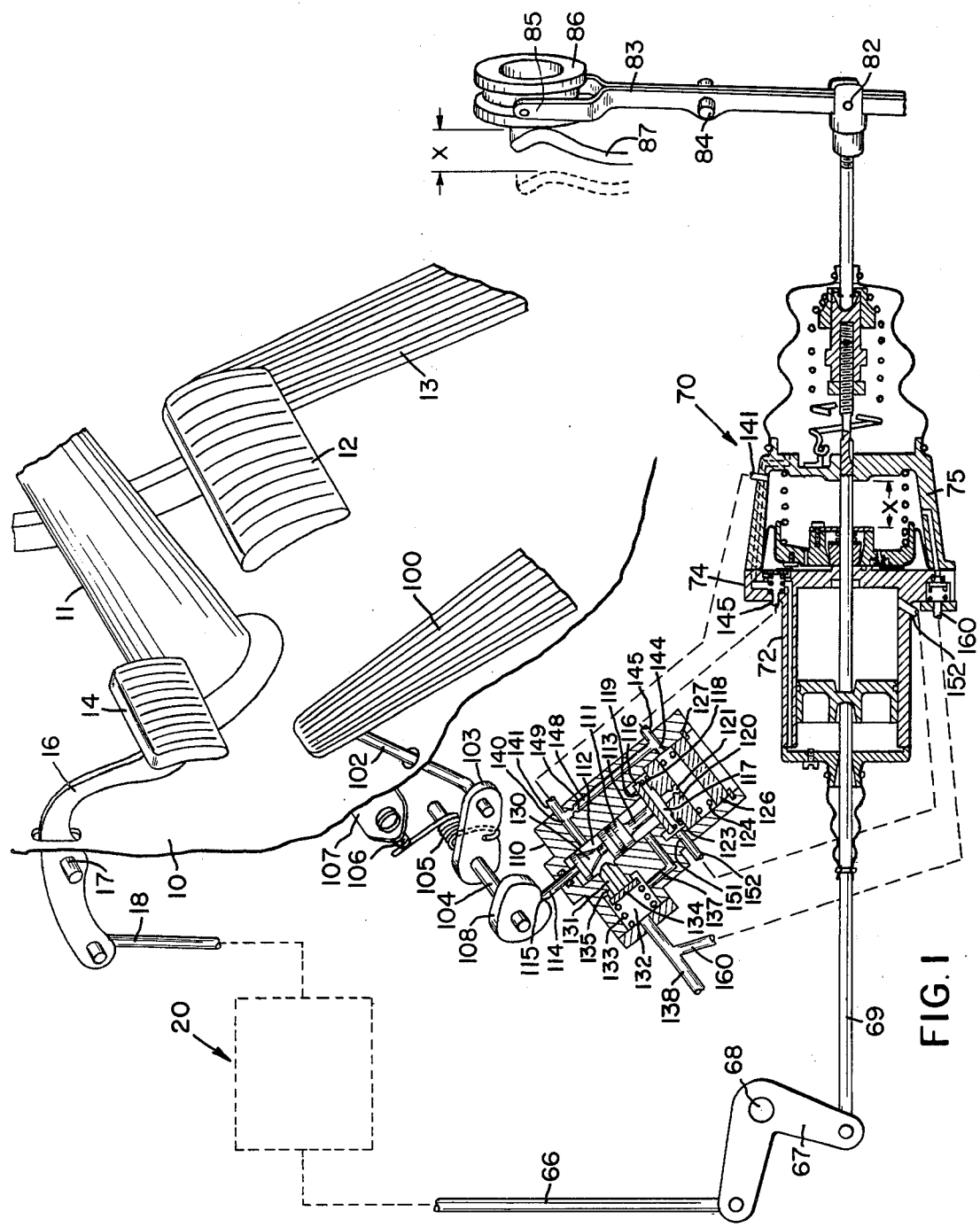
FIG. 1 is a fragmentary perspective view of part of an automotive vehicle and a combination clutch and parking brake operating mechanism made therefor in accordance with one embodiment of this invention.

The hereinafter-described clutch actuating mechanism utilizes two foot pedals: the first for selectively connecting the vacuum side of an automotive engine manifold to an actuator to disengage an autobobile clutch during operation of its engine; and the second for manually overriding or disengaging the clutch at any time, even when the associated automobile engine is not operating. This second pedal may also be used for applying the parking brake of the vehicle.

Referring now to the drawings by numerals of reference, and first to the embodiment illustrated in FIGS. 1 to 4, 10 denotes the floor board of a conventional automotive vehicle, which has the usual steering post or column 11, brake pedal 12, and accelerator pedal 13. Numeral 14 denotes a combination clutch override and parking brake pedal, which is located adjacent the steering column 11 approximately where most conventional parking brake pedals are found in modern automobiles. Pedal 14 is mounted on the upper end of a lever 16, which is mounted intermediate its ends beneath the floorboard to pivot about a stationary pin 17 in much the same manner as the conventional parking brake lever. At its inner or lower end pin 17 is pivotally connected to the upper end of an operating rod 18 for a clutch override mechanism 20 of the type disclosed in detail in FIGS. 2 to 4.

Figure 4:
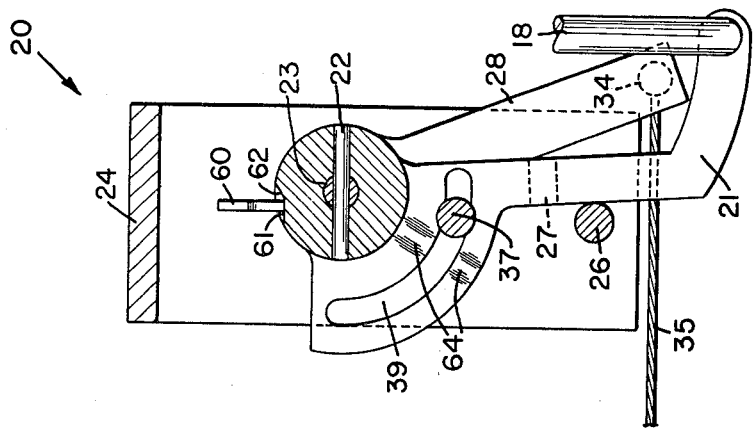
FIG. 4 is a fragmentary sectional view taken along the line 4—4 in FIG. 2 looking in the direction of the arrows.
Figure 3:
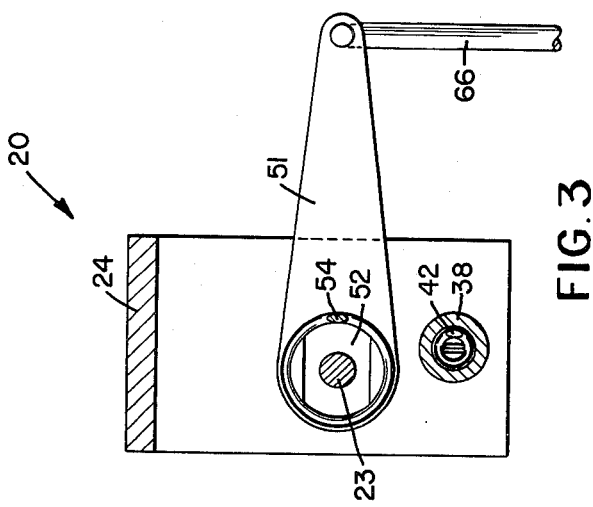
FIG. 3 is a fragmentary sectional view taken along the line 3—3 in FIG. 2 looking in the direction of the arrows.
Figure 2:
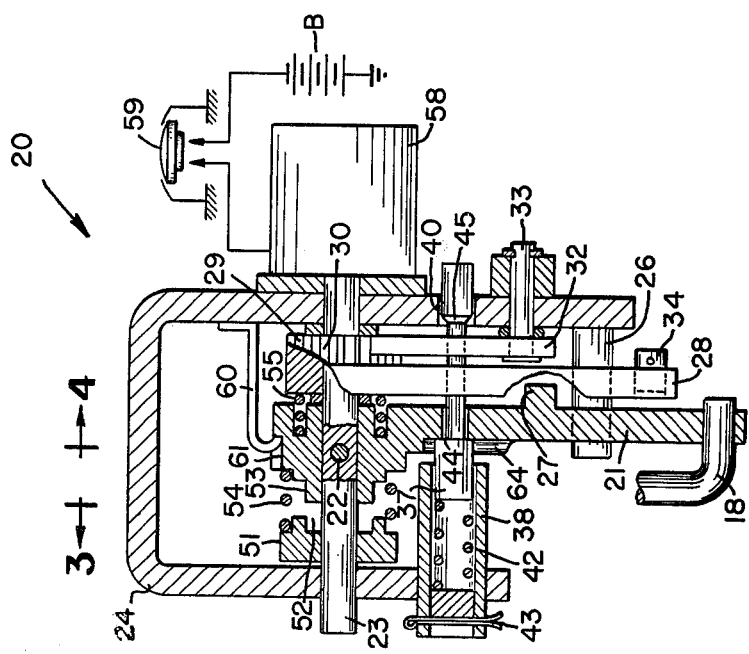
FIG. 2 is a fragmentary sectional view taken substantially through the center of the clutch override and parking brake unit which forms part of this mechanism, portions of the unit being shown in full, and other portions thereof being broken away for purposes of illustration.
Figure 5:
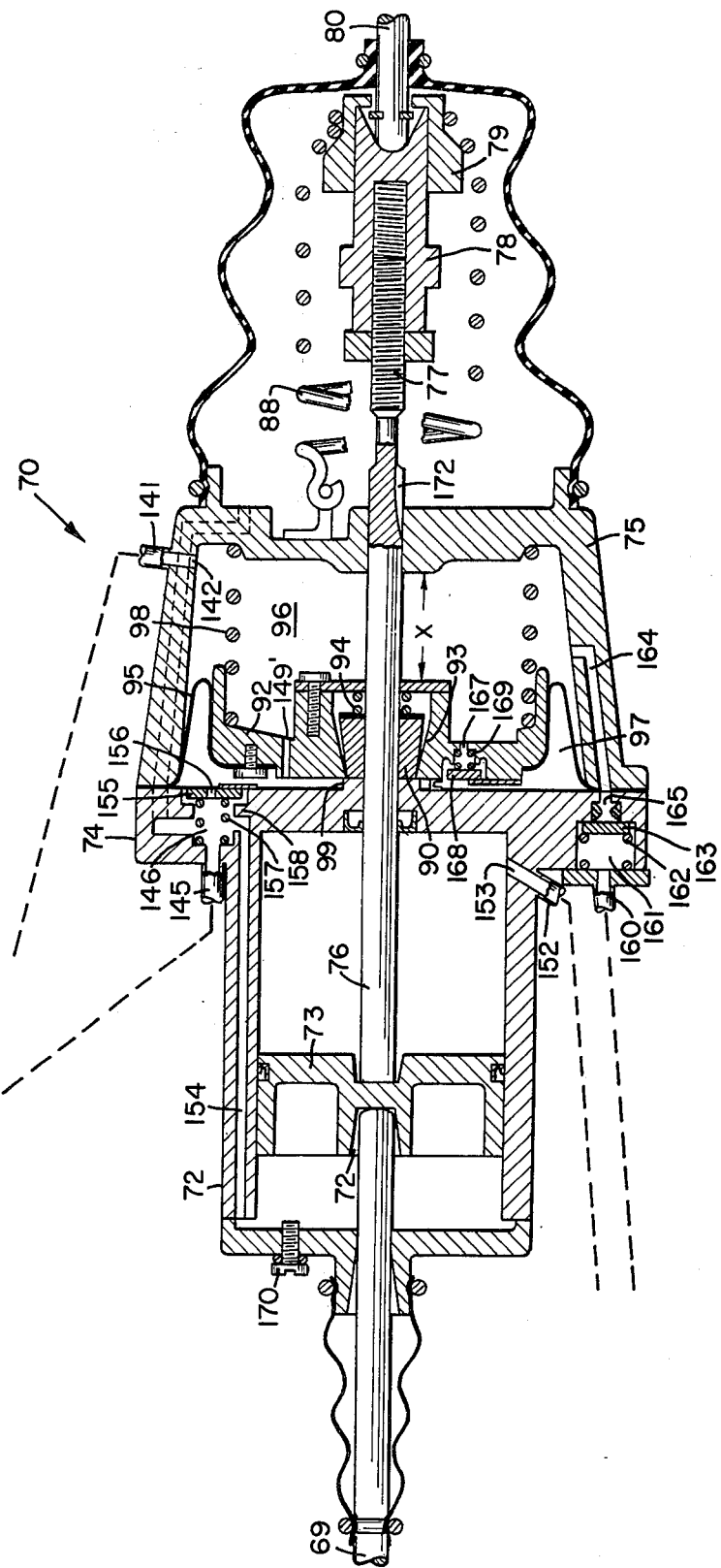
FIG. 5 illustrates fragmentarily, and for greater clarity, an enlarged view of part of the clutch operating mechanism shown in FIG. 1.

Referring now to FIGS. 2 to 4, the lower end of rod 18 is pivotally connected to the lower end of lever 21, the upper end of which is secured by pin 22 to a shaft 23 that is mounted for limited pivotal and axial movement between the legs of a generally U-shaped bracket 24, which is fastened at any convenient point below the floorboard 10. A spring (not illustrated) normally urges lever 21 clockwise about the axis of shaft 23, as illustrated in FIG. 4, and into engagement with a stop or pin 26, which projects from one leg of bracket 24. Intermediate its ends lever 21 has a projection 27, which projects laterally beneath a ratchet arm 28 when lever 21 is in its brake actuating position as shown in FIGS. 2 to 4. Arm 28 is integral with a ratchet 29 that is rotatably mounted on shaft 23 at one side (the right side in FIG. 2) of lever 21. The teeth 30 of ratchet 29 are engageable by a pawl 32, which is mounted by a pin 33 on a leg of racket 24 for pivotal movement adjacent the ratchet arm 28. A pin 34 in the lower end of arm 28 is connected by a cable 35 to the automobile parking brake mechanism (not illustrated), which maintains tension in the cable 35 in the usual manner so that when the brake is released (FIG. 4) arm 28 is urged resiliently clockwise about shaft 23 (FIG. 4) toward a rest position against projection 27.

A two-headed brake release pin 37 is mounted at one end to reciprocate in a tubular guide or sleeve 38, which is secured intermediate its ends in the leg of bracket 24 opposite that upon which the pawl 32 is mounted. Intermediate its ends pin 38 has reduced-diameter portion that projects slidably through an arcuate slot 39 (FIG. 4) in the upper end of lever 21, beneath the pawl 32, and slidably through a registering opening 40 (FIG. 2) in the opposite leg of bracket 24. A spring 42, which is retained by a cotter pin 43 in the sleeve 38, urges pin 37 toward the right in FIG. 2, so that when lever 21 is in its illustrated position, a circumferential shoulder 44 (FIG. 2) on pin 37 adjacent its left end is seated against a plane surface at one side of lever 21, and a conical shoulder 45, which is formed on the pin adjacent its opposite end, is located within the opening 40 in the bracket leg, and in laterally spaced relation to pawl 32.

Pivotally mounted at its inner end on shaft 23 adjacent the side of lever 21 remote from ratchet 29 is a clutch override lever 51. A rectangular groove 52 in the inner end or hub of lever 51 extends transverse to shaft 23, and faces a similarly shaped rectangular tooth or boss 53 that is formed on the hub of lever 21. A relatively light compression spring 54 is interposed between levers 21 and 51 merely to maintain lever 51 in its extreme left hand position on shaft 23 as shown in FIG. 2. A more powerful spring 55 (FIG. 2), however, is interposed between lever 21 and ratchet 29 normally to urge shaft 23 and the attached lever 21 toward the left from the braking position illustrated in FIG. 2 to a clutch actuating position (not illustrated), wherein the tooth 53 is drivingly engaged in notch 52 on lever 51.

The end of shaft 23 remote from lever 51 is operatively connected to the armature of a solenoid 58 (FIG. 2), which is mounted on the outside of bracket 24 for energization by a pushbutton switch 59 that is mounted at any convenient point in the vehicle for manual operation by the driver, whenever it is desired to apply the vehicle's parking brake. Switch 59 connects solenoid 58 to, for example, the usual automobile battery B (FIG. 2), so that whenever the driver pushes button 59, the solenoid 58 is energized to shift shaft 23 to the right against the resistance of spring 55 from its extreme left hand or clutch actuating position (not illustrated) to its extreme right hand position where the hooked end of a leaf spring 60 on the bracket 24 engages in a notch 61 formed in the upper end of lever 21 to hold the latter in its brake actuating position as shown in FIG. 2. In this position the tooth 53 on lever 21 is disengaged from the notch 52 in lever 51, and the projection 27 on lever 21 has shifted behind ratchet arm 28 (FIGS. 2 and 4), so that when the driver pushes on pedal 14 (FIG. 1), lever 16 elevates rod 18, and lever 21 is swung counterclockwise (FIG. 4) about shaft 23 so that its projection 27 rotates the ratchet arm 28 in the same direction from its position shown in FIG. 4. This rotates the ratchet 29 counterclockwise relative to pawl 32, and also draws cable 35 to the right in FIG. 4 to apply the parking brake in a manner that will be apparent to one skilled in the art.

When the brake has been fully applied, arm 28 will have rotated to its counterclockwise limit position (not illustrated), where it will be held by engagement of the upper end of pawl 32 with teeth of the ratchet 29. Moreover, during the brake applying rotation of lever 21, leaf spring 60 will have ridden up the inclined ramp portion 62 of notch 61, and onto the peripheral surface of the hub on lever 21, so that by the time this lever has reached its counterclockwise limit position, the spring 60 will have become disengaged from the notch 61, and the spring 55 will have shifted lever 21 and shaft 23 axially toward the left in FIG. 2 far enough to engage the dog 53 with the confronting side of the lever 51. At this time, however, dog 53 will extend transverse to the groove 52 and will not immediately reseat in the groove. Therefore when the driver releases the pedal 14, lever 21 is swung by its spring (not illustrated) clockwise back to its position of rest against the stop pin 26 (FIG. 4), at which time the dog 53 swings into alignment with the groove 52, and spring 55 once again urges dog 53 into driving engagement with this groove.

Thereafter, if the operator again steps on pedal 14 without pushing the button 59 to retract shaft 23 toward the right in FIG. 2, the lever 21 will remain drivingly engaged with the clutch override lever 51, and the counterclockwise rotation of lever 21 will be transmitted to lever 51 to operate the vehicle's clutch as described hereinafter. Also during this counterclockwise rotation of lever 21, two inclined camming surfaces 64, which are formed on lever 21 at opposite sides of its slot 39, pass beneath and engage the shoulder 44 on the brake release pin 37, so that this pin is urged into sleeve 38 far enough to cause the conical camming surface 45 thereon to be drawn beneath, and into engagement with the pawl 32 to pivot the upper end of the pawl out of engagement with the teeth on the ratchet 29. This allows ratchet arm 28 to rotate back to its brake releasing position (FIG. 4), whereby cable 35 is permitted to shift toward the left (FIG. 4) far enough to release the vehicle's parking brake.

When the lever 21 is held in its brake operating position by the spring detent 60 as shown in FIG. 2, passage of the camming surface 64 beneath the shoulder 44 on the pin 34 will not cause the pin to be drawn far enought toward the left to shift its conical surface 45 beneath the pawl 32. However, when lever 21 is in its extreme left hand position (not illustrated) where it is drivingly engaged with lever 51, the conical surface 45 will operate to release pawl 32, when lever 21 is rotated counterclockwise (FIG. 4). Thus, whenever the parking brake has been applied, subsequent operation or depression of the pedal 14, without operation of the parking brake switch 59, will automatically cause the brake to be released, and the clutch to be disengaged as described hereinafter.

The clutch override lever 51 is pivotally connected at its outer end by a rod 66 (FIGS. 1 and 3) to one arm of a two-armed lever 67 (FIG. 1) which is mounted intermediate its ends beneath the floorboard to pivot about a stationary pin 68. The other arm of this lever is pivotally connected by a piston rod 69 to a pressure-operated power or coupling unit denoted generally at 70 in FIG. 1. This unit comprises a hollow cylinder or housing 72 containing a reciprocable piston 73, which is attached to rod 69 for reciprocation therewith. Housing 72 also has a flanged end 74 to which the open end of a hollow cap or generally cup-shaped member 75 is secured coaxially thereof by any conventional means (not illustrated). Secured at one end coaxially thereof to the side of piston 73 opposite rod 69, and extending slidably through the flanged end 74 of housing 72 and the attached cap 75 is a reciprocable rod shaft 76, which has a threaded end 77, that is adjustably connected exteriorly of cap 75 by conventional coupling members 78 and 79 with a reciprocable clutch operating rod 80. Rod 80 is pivotally connected by a pin 82 to one end of a lever 83, which is pivotally mounted intermediate its ends on a stationary pin 84. Pivotally mounted in known manner between furcations 85 formed on the opposite end of lever 83 is the usual "throw-out" bearing 86, which is operable to manipulate in known manner the clutch fingers 87 of a conventional clutch mechanism (not illustrated) that is employed to enable the shifting of the vehicle's standard transmission. For a more detailed description of this type of clutch reference is made, merely by way of example, to the McRay et al. U.S. Pat. No. 3,292,751 which shows a throw-out bearing 24 for controlling clutch plates 19 and 21. A tension spring 88, which is secured at one end to coupling member 79 and its opposite end to the cap 75 on housing 72, urges the clutch operating rod 80 toward the left in FIG. 1 normally to swing lever 83 to its extreme clockwise position about pin 84 wherein bearing 86 and fingers 87 are held in their inactive positions so that the clutch faces (not illustrated) are normally engaged to transmit drive from the engine to the transmission in the usual manner.

Surrounding rod 76 (FIG. 1) and axially slidable thereon within cap 75 is a resilient, generally truncated-conical collar or coupling member 90. A cooperating, generally annular, coupling member 92, which surrounds member 90, has an axial bore that is tapered at one end as at 93. A spring 94 is mounted in the opposite end of this bore to urge member 90 axially toward the tapered end 93 of the bore in member 92. Around its outer edge member 92 is secured to one end of a flexible sleeve or diaphragm 95, the outer, marginal edge of which is secured between the housing flange 74 and the rim of cap 75 operatively to divide the interior of cap 75 into chambers 96 and 97, respectively. A compression spring 98 is mounted in chamber 96 between member 92 and cap 75 normally to urge the coupling members 90 and 92 to their released positions as shown in FIG. 1, wherein a circumferential shoulder or boss 99 on the adjacent end of housing 72 causes member 90 to be shifted axially away from engagement with the tapered end 93 of member 92, thus permitting member 90 to slide axially relative to rod 76. Under these circumstances, whenever the clutch override lever 51 is pivoted by operation of pedal 14, as noted above, the clockwise (FIG. 3) or downward movement of lever 51 will be transmitted directly through rod 66, lever 67, rods 69, 76 and 80 to the clutch operating lever 83 to effect disengagement of the clutch without imparting any movement to the coupling members 90 and 92. Pedal 14 is normally used in this manner to disengage the clutch for shifting purposes whenever the associated automobile engine is not running, as for example upon starting the engine.

To control the operation of the clutch operating rod 80 when the vehicle is being operated — i.e., when its engine is running — a special clutch pedal 100 (FIG. 1) is pivotally connected to the upper end of a rod 102, which projects slidably through an opening in floorboard 10 adjacent, or to the left of, the accelerator pedal 13. The lower end of rod 102 is pivotally connected to one end of a lever 103, the opposite end of which is fastened to a cam shaft 104 that is mounted beneath the floorboard for oscillation about a stationary axis. A coiled torsion spring 105 on shaft 104 is engaged at one end with lever 103 and at its opposite end with a setscrew 106, which is adjustably threaded into a stationary bracket 107 beneath the floorboard. Spring 105 normally urges lever 103 and shaft 104 into the positions illustrated in FIG. 1.

A disc cam 108 is fixed to shaft 104 for oscillation thereby adjacent a stationary valve block 110, which is mounted in any conventional manner beneath floorboard 10 adjacent shaft 104. A piston 111, which is reciprocable in an axial bore 112 in block 110, has adjacent its lower end a cylindrical shank portion 113, and on its upper end a reduced-diameter stem portion 114 that projects slidably out of the upper end of block 110 normally to seat in a notch 115 formed in the periphery of the cam 108. The lower end of bore 112 is normally closed by a disc valve 116, which reciprocates in a counterbore 117 in the lower end of block 110. Valve 116 is urged by a spring 118 against an annular valve seat 119 formed in the counterbore 117 around the lower end of bore 112 coaxially thereof. Spring 118 is interposed between the valve 116 and an annular piston member 120, which is axially slidable in counterbore 117, and which has an axial bore or port that is throttled by a restriction 121. Member 120 is held resiliently against an internal shoulder 123 in counterbore 117 by another spring 124, which is held against member 120 by a porous filter element 126 that is removably secured in the outer end of counterbore 117 by a conventional C-ring 127.

When cam 108 is in its normal position as shown in FIG. 1, springs 118 and 124 urge the piston 111 upwardly in bore 112 to its illustrated position, wherein a conical camming surface 130 on the inner end of the stem 114 is spaced slightly from the inner end of a reciprocable valve 131, which projects from a radial valve port 132 formed in block 110 adjacent its upper end. A spring 133 in the valve port 132 normally urges valve 131 to a closed position in which its head 134 is seated sealingly against an annular valve seat 135 that is formed in block 110 adjacent the inner end of port 132. Intermediate its ends port 132 is connected by a duct 137 in block 110 with the lower end of bore 112 between piston 111 and valve 116; and at its outer end it is connected by a tubular duct 138 to the vacuum side of the manifold in the vehicle's engine for purposes to be described hereinafter.

Adjacent its upper end block 110 has therein another radial port 140, which opens at its inner end on the bore 112 between piston 111 and the stem camming surface 130, and which is connected at its outer end by tubing 141, or the like, with a port 142 in cap 75. At its lower end block 110 has therein still a further port 144 which opens at its inner end on the counterbore 117 between filter 126 and the member 120, and which is connected at its outer end by tubing 145 with a port 146 in the flanged end 74 of housing 72. Intermediate their ends the radial ports 140 and 144 open on opposite ends of a duct 148, which is formed in block 110 with a restriction 149 located adjacent one end thereof.

Whenever the vehicle's engine is running, the clutch pedal 100 may be used to operate its clutch through the power unit 70. For example, assuming that a vacuum is being applied from the engine manifold through line 138 to valve port 132 and the duct 137, a vacuum will exist in the valve block bore 112 between piston 111 and the now-closed valve 116. Therefore, as soon as the operator begins to push downwardly on the clutch pedal 100, the lever 103 swings downwardly to rotate shaft 104 and its cam 108 clockwise in FIG. 1, thus causing stem 114 and its attached piston 111 to be driven downwardly in bore 112. This causes the piston shank 113 to urge valve 116 downwardly off of its valve seat 119, and against movable member 120 to seal its axial bore. As valve 116 disengages its valve seat, the vacuum in bore 112 is applied through another port 151 in block 110, a duct or tube 152, and a port 153 in cylinder 72 to the right side of piston 73 as shown in FIG. 1.

At this time air at atmospheric pressure enters through the filter 126 to the counterbore 117 in block 110, and through port 144, duct 145, port 146 and an axially extending duct 154 in cylinder 72 to the left side of piston 73, thus enabling the vacuum now developed at the right hand side of this piston to draw piston 73 toward the right in cylinder 72. For example, as the clutch faces wear after repeated use, the clutch lever 83 is pivoted further in a clockwise direction (FIG. 1), and consequently the piston 73 comes to rest closer to the left hand of cylinder 72 when the clutch is applied. The vacuum initially developed in cylinder 72 at the right side of piston 73 will cause this piston and the associated rods 69, 76 and 80 to be shifted to the right in FIG. 1 against the resistance of spring 88 far enought to take up any slack. This movement, however, operates only to take up the lost motion or free play in the linkage, and is not sufficient to overcome the force of the main clutch springs, which normally holds the clutch faces engaged. Moreover, this initial movement of the piston 73 toward the right in cylinder 72 takes place very rapidly as soon as valve 116 is disengaged from its valve seat, and before the piston stem 114 has ridden up onto the high point on the periphery of cam 108. Also at this time the resilient coupling member 90 is not operatively engaged by the conical bore 93 in member 92, whereby rod 76 is free to slide axially in the bore of member 90.

After the initial downward movement of piston 113 has shifted valve 116 against member 120, the continued downward movement of the clutch pedal 100 by the operator causes cam 108 finally to shift the conical camming surface 130 at the inner end of stem 114 into contact with the inner end of the triangularly shaped stem portion of valve 131, which is thus shifted outwardly to shift its head 134 off seat 135, and to allow vacuum from the line 138 to be applied through the valve port 140, tubing 141 and port 142 to the chamber 96 in cap 75. At this time chamber 97 at the opposite side of diaphragm 95 is connected through a normally-open valve 155 with air at atmospheric pressure in port 146. Valve 155 has a small bleeder opening 156 in its center, and is normally held open, or off its seat 158 by a spring 157. Also at this time, the restriction 149 in the duct 148 throttles airflow between ports 140 and 144 in block 110 so that a vacuum can be maintained in chamber 96 at this time. Cooperating with restriction 149 in duct 148 is a small port or restriction 149' in diaphragm holding member 92. Restriction 149' permits the path 138, 135, 112, 140, 141, 96, 97, 146, 145 and 126 to be a tailorable, through flow circuit. This contrasts with the dead ended path 117, 152, 153 to the right side of piston 73. Because of the longer time involved in transfer of a greater number of air molecules to reach a stabilized vacuum in chamber 96, the through flow circuit will react more slowly than the dead ended path just mentioned.

The vacuum now acting on diaphragm 95 causes member 92 to be shifted toward the right, so that its conical bore surface 93 engages and grips member 90 to carry it toward the right end of chamber 96. As soon as collar 90 is shifted away from the boss 99 on cylinder 72, spring 94 urges it toward the tapered end of bore 93 in member 92, so that it tends to compress or retract into gripping engagement with the shaft 76, which may be treated with a high friction coating, if desired. This gripping action on the part of member 90 causes rod 76 to be moved with member 92 toward the right in chamber 96 until the coupling members have travelled the distance X (FIG. 1), which will bring the right end of member 92 into engagement with the closed end of cap 75 against the resistance of spring 98. This movement of rod 76 will be transmitted to rod 80, which will pivot lever 83 counterclockwise to shift the clutch fingers 87 the same distance X, thereby completely disengaging the clutch faces (not illustrated) so that the transmission can be shifted in known manner.

It is desired that piston 73 first complete its full travel to take up slack, prior to actual separation of the clutch faces. This is followed by actuation of the diaphragm 95 and diaphragm holder 92 in the tailorable through flow circuit previously mentioned. Thus the dead ended circuit and the through flow circuit further cooperate with the contour of cam 108 to produce the sequential power unit 70 actuating effect wherein piston number 73 first completes its travel relative to member 92, prior to actuation of diaphragm 95 mounted on holder 92.

After the transmission has been shifted, the operator may release the clutch pedal 100 immediately permitting "snap back" return of the cam 108 to its original position. When this occurs stem 114 will reengage in the notch 115 in cam 108, thereby allowing piston 113 to be returned upwardly to its starting position as illustrated in FIG. 1. This allows the spring loaded valves 116 and 131 to return also to their original or closed positions, thereby removing the vacuum from the right side of piston 73 in the cylinder 72, and from the port 140 so that air at atmospheric pressure bleeds slowly through the restriction 149 in duct 148, and tubing 141 to chamber 96. As the pressure increases in chamber 96 the springs 88 and 98 urge coupling members 90 and 92, and rod 76 toward the left in FIG. 1. During this travel the spring 94 maintains the coupling member 90 and 92 engaged, and thus member 90 in gripping engagement with rod 76. When the projecting end of member 90 strikes the boss 99 on casing 72 the coupling is released from rod 76.

The initial return movement of member 92 toward the left of chamber 96 is rather rapid, because the scalloped periphery of the normally-open valve 155 permits air to be exhausted rapidly out of chamber 97 and port 146 to atmosphere. However, shortly after member 92 commences its return movement, the pressure in chamber 97 is increased above atmospheric pressure, thereby forcing valve 155 to close on seat 158 against the resistance of spring 157, so that further exhaustion of chamber 97 can take place only through the restricted axial bore 156 in the valve 155. This valve thus functions as a dash pot to control the rate of movement of the coupling members 90 and 92 toward the left in FIG. 1, and consequently operates automatically to control the rate at which the clutch faces are reengaged. This contrasts with conventional clutch operation, which requires that the operator carefully manipulate the clutch pedal to prevent the clutch faces from reengaging too slowly or too quickly, which would result in a sudden or jerking movement of the vehicle or unnecesary wear of the clutch facings.

In certain cases, as when the operator wishes to "inch" the vehicle forwardly or rearwardly, as when parking or the like, the clutch pedal 100 can be gradually manipulated back and forth rather than being allowed to slip suddenly back to its start or clutch-engaging position. This permits slight slipping of the clutch faces in known manner; and to control this slipping, the modulation of the vacuum in chamber 96 can be controlled by careful shaping of the contour of cam 108 and the camming surface 130 that controls valve 131.

The desired or optimum rate of clutch engagement preferably varies with the engine speed of the associated vehicle. For example, the standard clutch can be engaged rather quickly at low engine speed, but undue wear may result if the rate of clutch engagement is not slowed down at higher speeds. For this reason the vacuum line 138 is also connected by a tube or duct 160 to another valve chamber 161 in the cylinder flange 74. A spring 162 in port 161 holds a disc valve 163 normally closed over one end of a duct 164, which is formed in cap 75 to connect chamber 96 with port 161. A restriction 165, which is formed in the inner end of port 161 beneath valve 163, throttles the airflow between chamber 96 and port 161 as noted hereinafter.

At lower engine speeds, for example when the vacuum developed in the manifold does not exceed approximately 18 inches of mercury, the spring 162 holds valve 163 closed. However, when the engine is operated at higher speeds, for example so as to develop a vacuum in the range of 18 to 26 inches of mercury in lines 138 and 160, the valve 163 is opened by the vacuum against the resistance of spring 162 to increase the vacuum that is developed in chamber 96 during the disengagement of the clutch. Therefore when the shifting has been completed and the clutch pedal 100 is released to allow the return of the power unit members to their positions as shown in FIG. 1, the return of chamber 96 to atmospheric pressure will take longer than usual, because of the restriction 165 in the duct 164; and consequently the rate at which the clutch is reengaged at high speed operation of the engine will be slower than the rate at lower speed.

Member 92 has therethrough a port 167 which opens at opposite ends on the chambers 96 and 97, respectively. A disc valve 168, which is mounted over the end of duct 167 that opens on chamber 97, is normally held in an open position by a spring 169. The purpose of this valve is to prevent the operator of the vehicle from purposely and harmfully holding the clutch pedal 100 at a high slippage position of the clutch to gain greater acceleration of the vehicle. When this action occurs, the manifold vacuum from the engine is decreased because of greater throttle opening. This decrease is reflected in chamber 96, which causes valve 168 to open, thus providing an additional flow path through member 92, thereby permitting the clutch to reengage and defeating the driver's effort to accomplish more slippage.

A screw 170 (FIG. 1), which is threaded into a small opening in the end of cylinder 72 remote from its flange 74, is removable to check the exact location of the piston 73 in the cylinder whenever the bushing 78 is adjusted on the threaded end 77 of rod 76 to adjust or readjust the free-play setting of this piston. The need for this adjustment may be indicated by an elongate, tapered groove 172, which is formed in the rod 76 adjacent its threaded end. As the wear between the clutch faces is increased, the lever 83 pivots further in a clockwise direction about pin 84 in order to engage the clutch faces; and consequently the piston 73 is shifted closer to the left end of cylinder 72 each time the clutch is engaged. As a result the rod 76 also is shifted further to the left, to the point where the left end of the groove 172 is shifed through the closed end of cap 75, and into communication with chamber 96, when the piston 73 reaches its position of rest in the left end of cylinder 72. The depth of groove 172 increases from its left to its right end, so that the further the groove is shifted into chamber 96, the greater is the rate at which this chamber is vented through groove 172 to the exterior of cap 75. This undesirable venting of chamber 96 results in a sluggish clutch release operation, and will indicate to the operator of the vehicle that the clutch faces need re-adjustment.

From the foregoing it will be apparent that the instant invention provides a relatively simple and reliable means for operating the clutch of an automotive vehicle, or the like. By utilizing the vacuum normally created in an engine for supplying power to the clutch operating mechanism the cost of the unit is minimized, as compared to units powered by separate, hydraulic or the like power supplies. Moreover, by combining the clutch override and parking brake functions in a unit operable by a single pedal, further economics are realized. By tailoring the size of restrictions 121 and 149 one size of power unit 70 will be adequate for use with smaller and larger diameter clutches; a major factor in lower cost of producing the device. Similarly the other two units 110 and 20 can be one manufactured size. With the novel power unit 70 disclosed herein, the wear developed in the clutch system during repeated use, for instance the slack or play developed in the clutch linkage upon wear of the clutch faces, is automatically adjusted for during initial application of vacuum to chamber 96, thereby assuring complete disengagement of the clutch each time pedal 100 is depressed. Also, excessive wear of the clutch faces will be detected by the loss of vacuum and consequent sluggish operation of the unit, as the groove 172 in shaft 76 begins to communicate with chamber 96.

Still a further advantage of the apparatus disclosed herein is that reengagement of the clutch at higher engine speeds will be controlled to take place slower than at lower speeds by use of the auxiliary vacuum supply line 160; and regardless of how quickly the clutch pedal 100 is released by the operator, the dash pot effect produced by valve 155 will prevent the clutch from reengaging unduly fast.

While this invention has been described in connection with the operation of a conventional automobile clutch, it will be apparent that it can be employed with equal benefits on the clutches of any automotive vehicle, or the like, where a clutch must be operated to permit the shifting of an associated transmission. Moreover, while still other modifications may be readily apparent to one skilled in the art, it is the intention that this application and the cliams herein cover any and all such modifications, as well as the embodiments specifically disclosed herein.

Having thus described my invention, what I claim is:
1. In combination with an automotive clutch of the type having confronting operating surfaces which are normally engaged, and which are disengaged upon movement of an associated throw-out bearing from an inactive to an active position, an actuator device comprising a clutch pedal normally disposed in an inactive position, and movable manually toward an active position, means including an operating rod normally holding said throw-out bearing in an inactive position , fluid power operated means controlled by said pedal for shifting said operating rod from a first to a second position to effect movement of said bearing from its inactive to its active position, and including a first member connected to said rod and movable, during the initial movement of said pedal toward its active position, a distance sufficient to shift said rod far enough toward its second position to take up any free play in the bearing holding means, and a second member releasably connected to said rod and operative during further movement of said pedal to its active position to move said rod fully to its second position thereby to place the throw-out bearing in its active position, control means operative, when said pedal has returned to its inactive position, initially to allow rapid return of said rod toward its first position, and then to slow down the rate of return of said rod as it approaches its first position, said first and second members comprising a pair of pistons mounted to reciprocate coaxially with said rod in a pair of spaced chambers, said rod being attaced to said bearing and to one of said pistons, means for selectively connecting said rod to the other of said pistons, and said fluid power operated means including valve means interposed between said clutch pedal and said chambers, and operable by said pedal selectively to connect said chambers to a fluid pressure source for imparting motion to said pistons, said valve means comprising a plurality or normally closed valves, means including a cam operable by said initial movement of said pedal to open one of said valves, thereby to connect the chamber containing said one piston to said pressure source to effect movement of said one piston and said rod in unison said distance sufficient to take up the free play in said bearing holding means, said cam being operable upon further movement of said pedal to open another of said valves to connect the other chamber containing said other piston to said pressure source to effect movement of said rod the remaining distance to its second position, and said connecting means comprising releasable coupling means in said other chamber operative releasably to secure said other piston to said rod during the reciprocation of said other piston thereby to impart the motion of said other piston to said rod.

2. The combination as defined in claim 1, wherein said control means comprises a spring-loaded valve operative initially to allow rapid return of said other piston to its starting position, and disposed to be urged to its closed position by the build up of fluid pressure in said other chamber during said initial return of said other piston, said spring-loaded valve having a central opening operable to permit reduced flow of fluid out of said other chamber, when the last-named valve is closed, thereby to slow the return movement of said other piston and said rod.

3. In combination with an automotive clutch of the type having confronting operating surfaces which are normally engaged, and which are disengaged upon movement of an associated throw-out bearing from an inactive to an active position, an actuator device comprising means including an operating rod normally holding said throw-out bearing in an inactive position, first and second members for moving said rod from a first position to a second position to effect movement of said bearing from its inactive to its active, clutch-disengaging position, a clutch pedal normally disposed in an inactive position, and movable manually toward an active position, first control means between said pedal and said first member and operative, when said pedal is pushed part way to its active position, to cause said first member to move said rod part way toward its second position to take up any slack in said holding means resulting from the wear of said operating surfaces, and second control means between said pedal and said second member and operative, when said pedal is pushed fully to its active position, to move said rod fully to its second position thereby to place the throw-out bearing in its active position.

4. The combination as defined in claim 3, wherein said control means are operative, when said pedal has returned to its inactive position, initially to allow rapid return of said rod toward its first position, and then to slow down the rate of return of said rod as it approaches its first position.

5. The combination as defined in claim 4, wherein said first and second members comprise a pair of piston mounted to reciprocate coaxially with said rod in a pair of spaced chambers, said rod is attached to said bearing and to one of said pistons, means is provided for selectively connecting said rod to the other of said pistons, and said control means comprises a valve interposed between said clutch pedal and said chambers, and operable by said pedal selectively to connect said chambers to a fluid pressure source for imparting motion to said pistons.

* * * * *